US010233884B2

(12) United States Patent
Tamura et al.

(10) Patent No.: US 10,233,884 B2
(45) Date of Patent: Mar. 19, 2019

(54) FUEL INJECTION VALVE WITH RESIN-COVERED TERMINAL-LEAD WIRE

(71) Applicant: Hitachi Automotive Systems, Ltd., Hitachinaka-shi, Ibaraki (JP)

(72) Inventors: Eiji Tamura, Isesaki (JP); Nobuaki Kobayashi, Maebashi (JP); Takahiro Saito, Isesaki (JP); Akihiro Yamazaki, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/758,682

(22) PCT Filed: Aug. 3, 2016

(86) PCT No.: PCT/JP2016/072751
§ 371 (c)(1),
(2) Date: Mar. 8, 2018

(87) PCT Pub. No.: WO2017/047265
PCT Pub. Date: Mar. 23, 2017

(65) Prior Publication Data
US 2018/0230953 A1    Aug. 16, 2018

(30) Foreign Application Priority Data
Sep. 16, 2015  (JP) ................. 2015-182414

(51) Int. Cl.
*F02M 51/06*  (2006.01)
*F16K 31/06*  (2006.01)
(Continued)

(52) U.S. Cl.
CPC ...... *F02M 51/0614* (2013.01); *F02M 51/005* (2013.01); *F02M 51/0682* (2013.01);
(Continued)

(58) Field of Classification Search
CPC ....... F02M 51/0614; F02M 2200/9015; F02M 51/061; H01F 7/128; H01F 7/1607; H01F 2007/062; F16K 31/0606; F16K 31/0651
(Continued)

(56) References Cited

U.S. PATENT DOCUMENTS 7,168,681 B2 * 1/2007 Yamashita ........... F02M 51/005
251/129.21
7,802,584 B2 * 9/2010 Ricco ................... F02M 47/027
239/585.3
(Continued)

FOREIGN PATENT DOCUMENTS

JP    2003-176764 A    6/2003
JP    2004-140154 A    5/2004
(Continued)

OTHER PUBLICATIONS

International Search Report (PCT/ISA/210) issued in PCT Application No. PCT/JP2016/072751 dated Oct. 11, 2016 with English translation (five pages).
Japanese-language Written Opinion (PCT/ISA/237) issued in PCT Application No. PCT/JP2016/072751 dated Oct. 11, 2016 (four pages).

*Primary Examiner* — John Bastianelli
(74) *Attorney, Agent, or Firm* — Crowell & Moring LLP

(57) ABSTRACT

The present invention includes a bobbin having a winding part around which a coil winding is wound, a terminal extending from the bobbin in the axial direction of the bobbin, and a wrapping part which is provided to the terminal and in which a terminal lead wire pulled out from a coil part that is wound around the winding part is wrapped and fused. The terminal lead wire wired between the bobbin and the wrapping part in a state of being in contact with the surface of the terminal. The peripheries of the bobbin, the wiring part of the terminal lead wire and the wrapping part are covered with resin.

8 Claims, 10 Drawing Sheets

(51) Int. Cl.
  *H01F 7/06* (2006.01)
  *F02M 51/00* (2006.01)
  *H01F 7/128* (2006.01)
  *H01F 7/16* (2006.01)
(52) U.S. Cl.
  CPC ............ *F16K 31/0651* (2013.01); *H01F 7/06* (2013.01); *H01F 7/128* (2013.01); *H01F 7/1607* (2013.01); *F02M 2200/9015* (2013.01); *H01F 2007/062* (2013.01)
(58) Field of Classification Search
  USPC ........ 251/129.15–129.22; 239/533.1–533.15, 239/585.1–585.5
  See application file for complete search history.

(56) References Cited

U.S. PATENT DOCUMENTS

| | | | |
|---|---|---|---|
| 2006/0186365 A1* | 8/2006 | Hirayama | F02M 51/005 251/129.21 |
| 2006/0214032 A1 | 9/2006 | Akabane | |
| 2015/0069152 A1* | 3/2015 | Shingu | F02M 51/005 239/585.1 |

FOREIGN PATENT DOCUMENTS

| | | |
|---|---|---|
| JP | 2006-90266 A | 4/2006 |
| JP | 2008-270242 A | 11/2008 |
| JP | 2010-203373 A | 9/2010 |
| JP | 2013-157384 A | 8/2013 |

* cited by examiner

FUEL INJECTION VALVE WITH RESIN-COVERED TERMINAL-LEAD WIRE

TECHNICAL FIELD

The present invention relates to a fuel injection valve for injecting fuel.

BACKGROUND TECHNOLOGY

As a background technology of the present technical field, a fuel injection valve has been known which is described in Japanese Patent Application Publication No. 2010-203373 (patent document 1). In the fuel injection valve described in the patent document 1, a coil device configuring a drive part is equipped. In this coil device, after the end part of a terminal lead wire on a winding start side is fixed at one fusing part, the terminal lead wire is wrapped around one wrapping part, and then pulled out downward along an axial direction from the one wrapping part. After that, the terminal lead wire is wired to a guide groove through one engaging groove, and by the guide groove, the pull-out direction of the terminal lead wire is changed from the downward direction to the circumferential direction of a bobbin. On the other hand, a terminal lead wire on a winding end side which is pulled out from the winding-end end part of the bobbin is engaged to the other engaging groove and pulled out upward, and is connected to the other fusing part through the other wrapping part.

PRIOR ART DOCUMENT

Patent Document

Patent Document 1: Japanese Patent Application Publication 2010-203373

SUMMARY OF THE INVENTION

Task to be Solved by the Invention

In the coil device of the patent document 1, the support for the terminal lead wire from a part of the pull-out of the terminal lead wire pulled out from the wrapping part to the guide groove is not sufficiently considered. In the coil device, after the terminal lead wire is wounded around the bobbin, the periphery of the bobbin is covered with resin by a secondary molding. At this time, the spaces between the bobbin and the wrapping parts and between the bobbin and the fusing parts are also covered with resin by the secondary molding. Consequently, the terminal lead wire positioned at the position between the winding part and the guide groove is covered with resin by the secondary molding.

The thermal expansion coefficient of the resin is five times larger than the thermal expansion coefficient of the terminal lead wire. The terminal lead wire pulled out to the position between the wrapping part and the guide groove therefore receives a large force duo to the thermal expansion coefficient difference between the terminal lead wire and the secondary molding resin by the influence of heat generation caused by the operation of the fuel injection valve and the an engine operation. In the worst case, there is possibility that the terminal lead wire is disconnected and a function is impaired.

An object of the present invention is to provide a fuel injection valve in which the disconnection of a terminal lead wire hardly occurs by appropriately carrying out the support for the terminal lead wire covered with resin.

Means for Solving the Task

To achieve the above object, the fuel injection valve of the present invention includes:

a valve seat and a valve body cooperatively opening and closing a fuel passage; and an electromagnetic drive part including a fixed iron core, a movable iron core and a coil device, which is configured to drive the valve body, wherein the coil device includes:

a bobbin having a winding part around which a coil winding is wound;

a terminal, one end part thereof embedded in the bobbin and the other end part thereof extending from the bobbin in an axial direction of the bobbin; and a wrapping part which is provided to the terminal and in which a terminal lead wire pulled out from a coil part that is wound around the winding part is wrapped and fused, wherein the terminal lead wire is wired between the bobbin and the wrapping part in a state of being in contact with a surface of the terminal, and wherein peripheries of the bobbin, a wiring part of the terminal lead wire and the wrapping part are covered with a resin.

Effects of the Invention

According to the present invention, a terminal lead wire covered with resin is laid along a terminal member having a thermal expansion coefficient close to the thermal expansion coefficient of the terminal lead wire, and the terminal lead wire can be supported by the terminal member, and thereby the force generated by thermal expansion coefficient difference, which is applied to the terminal lead wire from a surrounding resin, can be small. Accordingly, the disconnection of the terminal lead wire can be avoided, and it is possible to provide a fuel injection valve having high reliability.

MODE FOR IMPLEMENTING THE INVENTION

One embodiment of the present invention will be explained with reference to FIG. 1 to FIG. 8.

Figure 1:
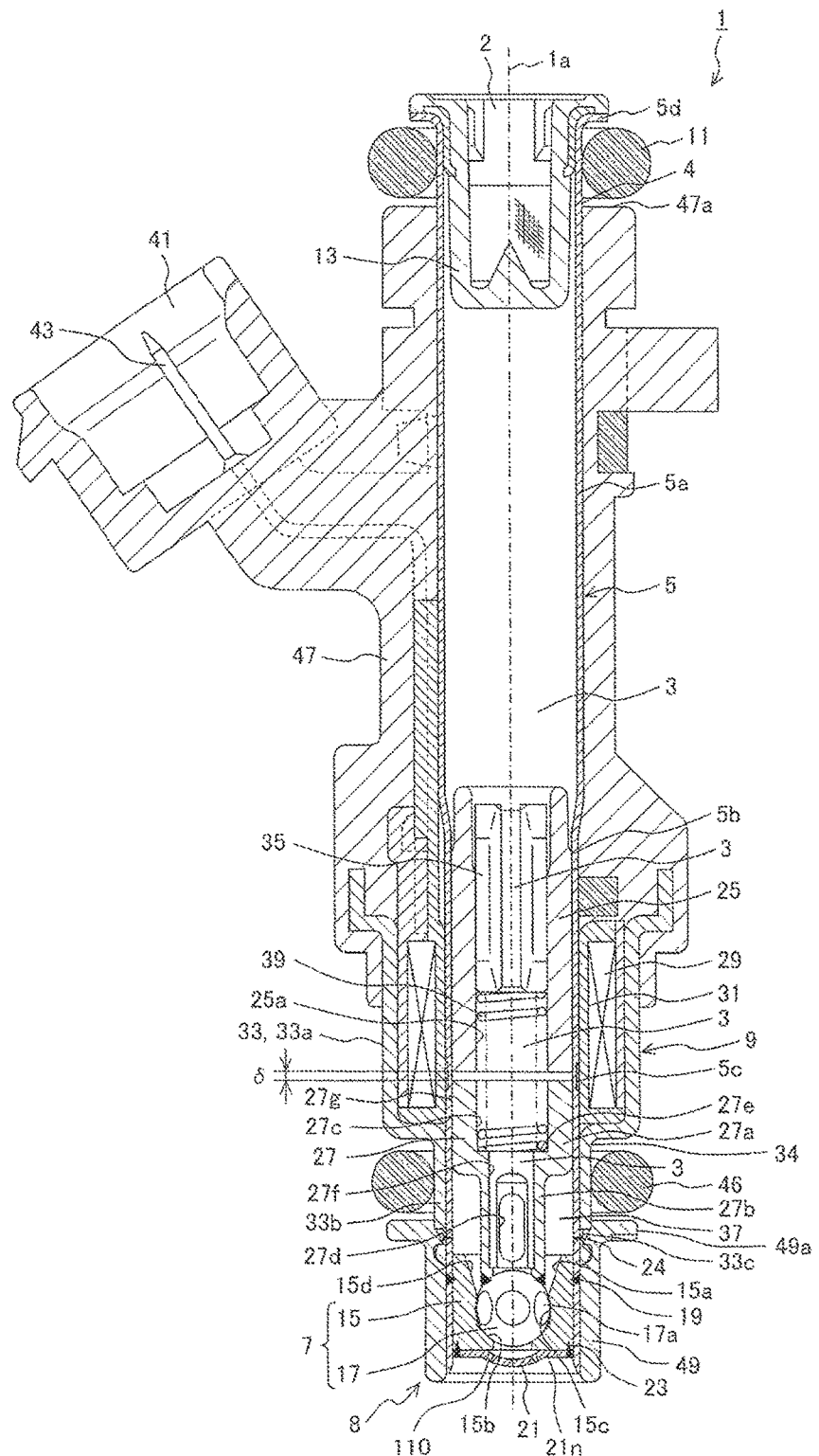
FIG. 1 is a sectional view showing the cross section along the axis of the valve (central axis) in one embodiment of a fuel injection valve according to the present invention.

The whole configuration of a fuel injection valve 1 will be explained with reference to FIG. 1. FIG. 1 is a sectional view showing the cross section along the axis of the valve (central axis) in one embodiment of the fuel injection valve according to the present invention. In addition, a central axis 1a corresponds to the axis (valve axis) of a movable element 27 provided integrally with the after-mentioned valve body 17, and to the central axis of the after-mentioned cylindrical body 5. Moreover, the central axis 1a also corresponds to the axis of the after-mentioned valve seat 15b and to an axis 31j (see FIG. 2) of a bobbin 31.

In the fuel injection valve 1, by the cylindrical body 5 made of metal, a fuel flow passage 3 is formed in its inside in a direction substantially along the central axis 1a. The cylindrical body 5 is formed in a shape having a step in the direction long the central axis 1a by press working such as deep-drawing by using metals such as stainless steel having magnetism. With this, the diameter of a one end side 5a of the cylindrical body 5 is larger than that of an other end side 5b thereof. In FIG. 1, the large diameter part 5a formed at the one end side is drawn so as to be the upper side of the small diameter part 5b formed at the other end side.

In FIG. 1, an upper end part (upper end side) is called as a base end part (base end side), and a lower end part (lower end side) is called as a distal end part (distal end side). The terms "the base end par (base end side)" and "the distal end part (distal end side)" are based on the flow direction of fuel. In addition, an up-and-down relation explained in the present specification is based on FIG. 1, and it is not related to a vertical direction (up-and-down direction) at the time when the fuel injection valve 1 is mounted on the internal combustion engine.

The base end part of the cylindrical body 5 is provided with a fuel supply port 2, and a fuel filter 13 is attached to the fuel supply port 2 to remove foreign substances mixed in the fuel.

The base end part of the cylindrical body 5 is formed with a flange part (enlarged diameter part) 5d formed by being bent such that the diameter of the base end part is enlarged radially outward. An O-ring 11 is disposed on an annular concave part (annular groove part) 4 formed of the flange part 5d and a base-end-side end part 47a of a resin cover 47.

The distal end part of the cylindrical body 5 is configured with a valve part 7 formed of the valve body 17 and a valve seat member 15. The valve seat member 15 is formed with a through hole 15a penetrating in a direction along the central axis 1a. A conical surface whose diameter gradually decreases toward a downstream side is formed in the middle of the through hole 15a, and by this conical surface, the through hole 15a is formed in a stepped shape. The valve seat 15b is formed on the conical surface, and the valve body 17 is brought into contact with and separated from the valve seat 15b, and the opening/closing of the fuel flow passage is performed. In addition, there is a case where the whole conical surface formed with the valve seat 15b is called as the valve seat 15b.

The inner circumferential surface on the upper side from the conical surface in the through hole 15a forms a valve body accommodating hole accommodating the valve body 17. The inner circumferential surface of the through hole 15a forming the valve body accommodating hole is formed with a guide surface 15c for guiding the valve body 17 in the direction along the central axis 1a. An enlarged diameter part 15d whose diameter is enlarged toward an upstream side is formed on the upstream side of the guide surface 15c. The enlarged diameter part 15d facilitates the attachment of the valve body 17, and serves to enlarge the cross section of the fuel flow passage. On the other hand, the lower end part of the through hole 15 opens to the distal end surface of the valve seat member 15, and this opening forms a fuel flow passage.

The valve seat member 15 is inserted into the inside on the distal end side of the cylindrical body 5, and is fixed to the cylindrical body 5 through a laser welding part 19 formed by laser welding. The laser welding part 19 is formed over the entire circumference from the outer circumferential side of the cylindrical body 5. In this case, the valve seat member 15 may be fixed to the cylindrical body 5 by the laser welding after the valve seat member 15 is press-fitted into the inside on the distal end side of the cylindrical body 5.

The distal end surface of the valve seat member 15 is attached with a nozzle plate 21n. The nozzle plate 21n is fixed to the valve seat member 15 by a laser welding part 23. The laser welding part 23 is formed around the circumference of an injection hole forming region at which fuel injection hole 110 are formed, so as to surround the injection hole forming region.

In addition, the nozzle plate 21n is formed by a plate-shaped member (flat plate) having a uniform thickness, and a projecting part 21 projecting outward is formed in the middle part of the nozzle plate part 21n. The projecting part 21 is formed by a curved surface (for example, a spherical surface). A fuel chamber is formed inside the projecting part 21. The projecting part 21 is formed with a plurality of the fuel injection holes 110.

By the above-mentioned nozzle plate 21n, a fuel injection part determining the form of fuel spray is formed. In the present embodiment, although only the fuel injection holes 110 are provided in the fuel injection part, a swirl chamber to swirl the fuel may be provided.

In the present embodiment, the valve part 7 including the valve seat member 15 and the valve body 17 and the fuel injection part 21 form a nozzle part 8 that controls the fuel injection and manages the formation of the fuel spray.

In the present embodiment, a ball valve is used as the valve body 17. In the valve body 17, a part opposed to the guide surface 15c is provided with a plurality of notched surfaces 17a formed at intervals in a circumferential direction, and a fuel passage is formed by these notched surfaces 17a. The valve body 17 can be formed by other than the ball valve. For example, a needle valve may be used.

A drive part 9 for driving the valve body 17 is disposed in the middle part of the cylindrical body 5. The drive part 9 is formed by an electromagnetic actuator (electromagnetic drive part). Specifically, the drive part 9 is formed of a fixed iron core 25 fixed to the inside (inner circumferential side) of the cylindrical body 5, the movable element (movable member) 27 which is arranged on the distal end side to the fixed iron core 25 in the cylindrical body 5 and which can move in the direction along the central axis 1a, an electromagnetic coil 29 fitted onto the outer circumferential side of the cylindrical body 5 at the position at which the fixed iron core 25 is opposed to a movable iron core 27a formed in the movable element 27 via a minute gap δ, and of a yoke 33 covering the electromagnetic coil 29 on the outer circumferential side of the electromagnetic coil 29.

The movable iron core 27a, the fixed iron core 25 and the yoke 33 form a magnetic path through which a magnetic flux generated by energizing the electromagnetic coil 29 flows. The magnetic flux passes through the minute gap δ. However, a magnetic throttling part 5c is disposed at a position of the cylindrical body 5 which corresponds to the minute gap δ, to reduce a leakage magnetic flux flowing through the cylindrical body 5 at a part of the minute gap δ. This magnetic throttling part 5c can be formed by non-magnetizing the cylindrical body 5 or by an annular concave part formed on the outer circumferential surface of the cylindrical body 5.

The electromagnetic coil 29 is wound around the bobbin 31 made of a resin material and formed in a cylindrical shape, and fitted onto the outer circumferential side of the cylindrical body 5. The electromagnetic coil 29 is electrically connected to a terminal 43 disposed in a connector 41. The after-mentioned coil device 600 (see FIG. 5) is formed of the electromagnetic coil 29, the bobbin 31, the terminal 43 and the like. The coil device 600 will be explained in detail below. A drive circuit which is not shown in the drawings is connected to the connector 41, and drive current is fed to the electromagnetic coil 29 via the terminal 43.

The fixed iron core 25 is made of a magnetic metal material. The fixed iron core 25 is formed in a cylindrical shape, and has a through hole 25a penetrating through the center part thereof in the direction along the central axis 1a. The fixed iron core 25 is press-fitted and fixed on the base end side of the small diameter part 5b of the cylindrical body 5, and positioned in the middle part of the cylindrical body 5. The large diameter part 5a is provided on the base end side of the small diameter part 5b, and thereby the attachment of the fixed iron core 25 becomes easy. The fixed iron core 25 may be fixed to the cylindrical body 5 by welding, or may be fixed to the cylindrical body 5 by using welding with press-fitting.

The movable element 27 is formed with a large diameter part 27a on the base end side, and this large diameter part 27a forms the movable iron core 27a opposed to the fixed iron core 25. A small diameter part (rod part) 27b is formed on the distal end side of the movable iron core 27a, and the valve body 17 is fixed to the distal end of the small diameter part 27b by welding. This small diameter part 27b forms a connection part for connecting the movable iron core 27a with the valve body 17. In the present embodiment, the movable iron core 27a and the connection part 27b are formed by one member made of the same material. However, two members are used and joined together, and they can be formed. In the present embodiment, the valve body 17 is provided as a different component from the movable element 27. However, the valve body 17 can be included into a part of the movable element 27. In addition, the outer circumferential surface of the movable iron core 27a comes into contact with the inner circumferential surface of the cylindrical body 5, and the movement of the movable element 27 in the direction along the central axis 1a (opening/closing valve direction) is guided. An annular projection portion may be circumferentially formed at a position shown by a reference sign 27g (the outer circumferential surface of the movable iron core 27a) to reduce the sliding resistance between the outer circumferential surface of the movable iron core 27a and the inner circumferential surface of the cylindrical body 5.

The movable iron core 27a is formed with a concave part 27c opened to the end surface opposed to the fixed iron core 25 in the central axis 1a. The bottom surface of the concave part 27c is formed with an annular surface 27e which becomes a spring seat for a spring (coil spring) 39. A through hole 27f penetrating up to the end part on the distal end side of the small diameter part (connection part) 27b along the central axis 1a is formed on the inner circumferential side of the annular surface 27e. In addition, an opening part 27d is formed on the side surface of the small diameter part 27b. A back pressure chamber 37 is formed between the outer circumferential surface of the small diameter part 27b and the inner circumferential surface of the cylindrical body 5. The through hole 27f is opened on the bottom surface of the concave part 27c and the opening part 27d is opened on the outer circumferential surface of the small diameter part 27b, and the fuel flow passage 3 is formed at the inside of the movable element 27, fuel flow passage 3 which communicates the base end part side of the movable element 27 with the back pressure chamber 37 formed at the side surface part of the movable element 27.

The coil spring 39 is disposed over the through hole 25a of the fixed iron core 25 and the concave part 27c of the movable iron core 27a in a compressed state. The coil spring 39 functions as a biasing member for biasing the movable element 27 in the direction in which the valve body 17 comes into contact with the valve seat 15b (valve closing direction).

An adjuster (adjusting element) 35 is disposed inside the through hole 25a of the fixed iron core 25, and the end part on the base end side of the coil spring 39 comes into contact with the end surface on the distal end side of the adjuster 35. By adjusting the position of the adjuster 35 in the through hole 25a in the direction along the central axis 1a, the biasing force of the movable element 27 (that is, the valve body 17) by the coil spring 39 is adjusted. The adjuster 35 has, in its center part, the fuel flow passage 3 penetrating in the direction along the central axis 1a. After flowing through the fuel flow passage 3 of the adjuster 35, the fuel flows through the fuel flow passage 3 at the distal end side part of the through hole 25a of the fixed iron core 25, and then flows through the fuel flow passage 3 formed in the movable element 27.

The yoke 33 is made of a metal material having magnetism, and also serves as a housing of the fuel injection valve 1. The yoke 33 is formed in a cylindrical stepped shape having a large diameter part 33a and a small diameter part 33b. The large diameter part 33a covers the outer circumference of the electromagnetic coil 29 and has a cylindrical shape, and the small diameter part 33b having a smaller diameter than the large diameter part 33a is formed on the distal end side of the large diameter part 33a. The small diameter part 33b is press-fitted onto the outer circumference of the small diameter part 5b of the cylindrical body 5. With this, the inner circumferential surface of the small diameter part 33b comes into tight contact with the outer circumferential surface of the cylindrical body 5. At this time, at least a part of the inner circumferential surface of the small diameter part 33b is opposed to the outer circumferential surface of the movable iron core 27a via the cylindrical body 5, and magnetic resistance of a magnetic path in this opposite part is lowered.

An annular concave part 33c is formed on the outer circumferential surface of the end part on the distal end side of the yoke 33 along a circumferential direction. In a thin part formed on the bottom surface of the annular concave part 33c, the yoke 33 and the cylindrical body 5 are joined over the entire circumference via a laser welding part 24 formed by laser welding. In addition, since the laser welding part 19 of the valve seat member 15 is positioned at a position further on the distal end side than the end part on the distal end side of the yoke 33, the assembling order of the valve seat member 15 and the yoke 33 is not limited.

A cylindrical protector 49 having a flange part 49*a* is fitted onto the distal end part of the cylindrical body 5, and the distal end part of the cylindrical body 5 is protected by the protector 49. The protector 49 covers the laser welding part 24 of the yoke 33.

A ring-shaped groove 34 is formed of the flange part 49*a* of the protector 49, the small diameter part 33*b* of the yoke 33 and the stepped surface between the large diameter part 33*a* and the small diameter part 33*b* of the yoke 33, and an O-ring 46 is fitted onto the ring-shaped groove 34. The O-ring 46 functions as a seal for securing liquid-tightness and airtightness between the inner circumferential surface of an insertion port 109*a* (see FIG. 13) formed on an internal combustion engine side and the outer circumferential surface of the small diameter part 33*b* in the yoke 33, when the fuel injection valve 1 is attached to the internal combustion engine.

The resin cover 47 is molded in a range from the middle part to a part close to the end part on the base end side of the fuel injection valve 1. The end part on the distal end side of the resin cover 47 covers a part on the base end side of the large diameter part 33*a* of the yoke 33. In addition, the resin cover 47 covers a wiring member 45, and by the resin cover 47, the connector 41 is integrally formed.

Next, the operation of the fuel injection valve 1 will be explained.

When the electromagnetic coil 29 is in a non-energization state and the drive current is not fed to the electromagnetic coil 29, the movable element 27 is biased in the valve closing direction by the coil spring 39, and the valve body 17 is in a state of being in contact with the valve seat 15*b* (seating state). In this case, the gap δ exists between the end surface on the distal end side of the fixed iron core 25 and the end surface on the base end side of the movable iron core 27*a*. In the present embodiment, the distance of this gap δ is equal to that of the stroke of the movable element 27 (that is, the valve body 17).

When the electromagnetic coil 29 is switched to an energization state, and the drive current is fed to the electromagnetic coil 29, a magnetic flux is generated in the magnetic path formed by the movable iron core 27*a*, the fixed iron core 25 and the yoke 33. By this magnetic flux, magnetic attraction force is generated between the fixed iron core 25 and the movable iron core 27*a* which are opposed to each other with the gap δ interposed therebetween. When this magnetic attraction force overcomes the resultant force of the biasing force by the coil spring 39 and fuel pressure acting on the movable element 27 in the valve closing direction, the movable element 27 starts moving in the valve opening direction. When the movable element 27 moves by a distance equal to the gap δ in the valve opening direction, and comes into contact with the fixed iron core 25, the movement of the movable iron core 27*a* in the valve opening direction is stopped, and the valve is opened, and then it becomes a stationary state (valve opening stationary state).

When the movable element 27 moves in the valve opening direction, and the valve body 17 is separated from the valve seat 15*b*, a gap (fuel flow passage) is formed between the valve body 17 and the valve seat 15*b*, and the fuel flows into the fuel chamber formed inside the projecting part 21 through the opening of the distal end surface of the valve seat member 15. The fuel supplied to the fuel chamber is injected to the outside of the fuel injection valve 1 from the fuel injection holes 110.

When the energization to the electromagnetic coil 29 is stopped, the magnetic attraction force is lowered, and then disappears. At this stage, when the magnetic attraction force becomes smaller than the biasing force of the coil spring 39, the movable element 27 starts moving in the valve closing direction. When the valve body 17 comes into contact with the valve seat 15*b*, the valve part 7 is closed and the valve body 17 becomes a stationary state (valve closing state).

A period of time from the point when the movable element 27 moves in the valve opening direction and the valve body 17 stars to separate from the valve seat 15*b* to the point when the movable element 27 moves in the valve closing direction and the valve body 17 comes into contact with the valve seat 15*b* again is called as a valve opening time (valve opening state), and a period of time when the valve body 17 comes into contact with the valve seat 15*b* and the valve is closed is called as a valve closing time (valve closing state). In this valve opening state, in a case where a period of time when the movable element 27 is moving in the valve opening direction is necessary to be distinguished from the above-mentioned valve opening stationary state and it is explained, this period of time is called as a valve opening operation state and it is explained.

In addition, there is a case where a projection is provided on the end surface of the movable iron core 27*a*, end surface which is opposed to the fixed iron core 25, to reduce squeezing force acting between the movable iron core 27*a* and the fixed iron core 25. In this case, the moving distance (stroke) of the valve body 17 becomes a dimension obtained by subtracting the height of the projection from the gap δ. In addition, there is a case where a stopper is provided for limiting the movement of the movable element 27 in the valve opening direction at a point before the movable iron core 27*a* comes into contact with the fixed iron core 25*a*.

Next, coil devices (electromagnetic coil devices) 200 and 600 will be explained in detail using FIG. 2 to FIG. 5.

Figure 2:
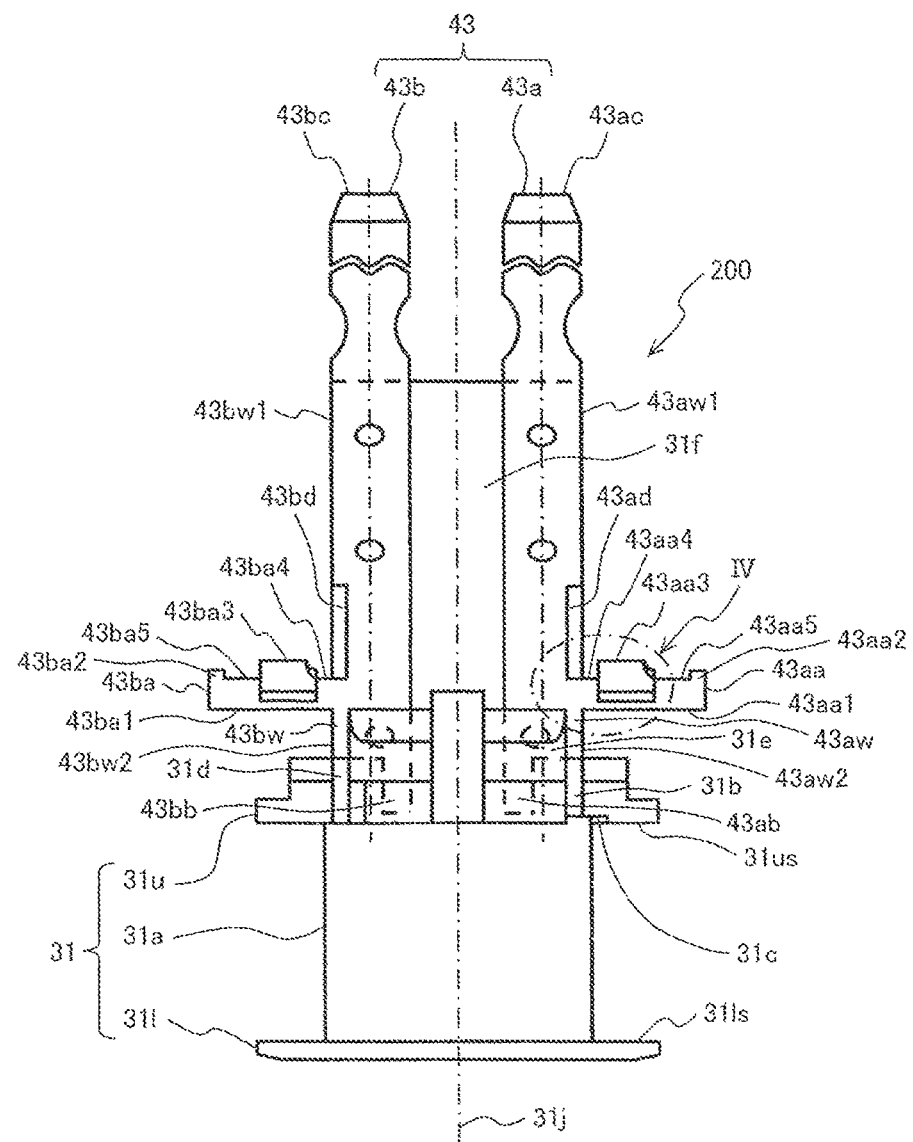
FIG. 2 shows a plan view showing a state before a coil winding is wound, in a coil device disposed to a drive part of the fuel injection valve shown in FIG. 1.

FIG. 2 shows a plan view showing a state before a coil winding is wound, in a coil device provided at the drive part of the fuel injection valve shown in FIG. 1.

The coil device 200 before the coil winding is wound is configured of the bobbin 31 around which the coil winding is wound and the terminal 43 (43*a*, 43*b*) fixed integrally to the bobbin 31 by resin molding.

The bobbin 31 is configured of a coil winding part 31*a* around which the coil winding is wound, an upper flange part (upper-part flange part) 31*u* formed at the upper part (on a terminal 43 side) of the coil winding part 31*a*, and of a lower flange part (lower-part flange part) 31*l* formed at the lower part (on the opposite side to the terminal side) of the coil winding part 31*a*. The outer circumferential surface of the coil winding part 31*a* has a cylindrical shape. The radius (diameter) of the upper flange part 31*u* is longer than radius (diameter) of the coil winding part. In addition, the radius (diameter) of the lower flange part 31*l* is also longer than the radius (diameter) of the coil winding part. A lower end surface 31*us* of the upper flange part 31*u* is opposed to an upper end surface 31*ls* of the lower flange part 31*l* with a distance equal to a length dimension in the axial direction of the coil winding part 31*a* therebetween. With this, the range where the coil winding is wound is defined by the lower end surface 31*us* of the upper flange part 31*u* and the upper end surface 31*ls* of the lower flange part 31*l*.

An embedded part 31*e* of the terminal 43 is formed on the upper side more than the lower end surface 31*us* of the upper flange part 31*u*, and a lower end part 43*ab* of the terminal 43*a* and a lower end part 43*bb* of the terminal 43*b* are embedded in the resin forming the embedded part 31*e*. In the present invention, the terminal 43 is embedded in a member (resin in the present invention) forming the bobbin 31 at the time of the molding of the bobbin 31. That is, the lower end part 43*ab* of the terminal 43*a* and the lower end part 43*bb* of the terminal 43*b* are embedded in the bobbin 31. The embedded part 31*e* formed by the forming member of the bobbin 31 forms a supporting part of the terminals 43*a* and 43*b*, and the forming member of the bobbin 31 becomes the supporting member of the terminals 43*a* and 43*b*.

Upper end parts 43*ac* and 43*bc* of the terminal 43 are exposed from the forming member of the bobbin 31, and extend in the axis 31*j* direction of the bobbin 31, and drawn out to the connector 41. The end parts 43*ac* and 43*bc* of the terminal 43 which are drawn out to the connector 41 are used for electrical connection with an external electric circuit.

A wrapping part 43*aa* for coil winding is provided between one end part 43*ab* and the other end part 43*ac* of the terminal 43*a*. In addition, a wrapping part 43*ba* for coil winding is provided between one end part 43*bb* and the other end part 43*bc* of the terminal 43*b*. The wrapping parts 43*aa* and 43*ba* are formed integrally with the terminal 43 by press working.

At this time, the wrapping parts 43*aa* and 43*ba* are provided to the terminal 43 so as to protrude in the direction orthogonal to the longitudinal direction (axial direction) of the terminal 43. The terminal 43*a* and the terminal 43*b* are arranged parallel to each other, and extend from the bobbin 31 in the axis 31*j*. The wrapping part 43*aa* of the terminal 43*a* is formed so as to project from side edges 43*aw*1 and 43*aw*2 positioned on the opposite side to the side edge adjacent to the terminal 43*b* toward the opposite side to the terminal 43*b*. In addition, the wrapping part 43*ba* of the terminal 43*b* is formed so as to project from side edges 43*bw*1 and 43*bw*2 positioned on the opposite side to the side edge adjacent to the terminal 43*a* toward the opposite side to the terminal 43*a*.

The terminal 43 is made of a metal material, and the wrapping parts 43*aa* and 43*ba* are made of the metal material which is the same material as the terminal 43.

In addition, as shown in FIG. 2, a resin part 31*f* is formed at a part on the upper side from the wrapping parts 43*aa* and 43*ba*, and the terminal 43 is supported by the resin part 31*f* also in the part on the upper side from the wrapping parts 43*aa* and 43*ab*. The entire circumference of the one end parts 43*ab* and 43*bb* of the terminal 43 is covered with the resin forming the embedded part 31*e*. However, in a part on the upper side from the wrapping parts 43*aa* and 43*ba*, the back surface (surface on the opposite side to the surface drawn in FIG. 2) and the side surfaces of the terminal 43 are covered with the resin part 31*f*. That is, in the part on the upper side from the wrapping parts 43*aa* and 43*ba*, the front surface of the terminal 43 (surface drawn in FIG. 2A) is exposed from the resin part 31*f*. In addition, the side surface of the terminal 43*a* and the side surface of the terminal 43*b* are formed with concave parts 43*ad* and 43*db* respectively. The concave parts 43*ad* and 43*bd* are filled with resin, and the terminals 43*a* and 43*b* are surely supported on the bobbin 31.

In addition, in a state in which the coil device 200 is attached to the fuel injection valve 1, the front surface of the terminal 43 drawn in FIG. 2 is positioned on the outer side in the radial direction of the fuel injection valve 1 and directed to an outer circumferential side. The back surface of the terminal 43 is positioned on the inner side (central axis 1*a* side) in the radial direction of the fuel injection valve 1 and directed to a central axis 1*a* side.

The upper flange part 31*u* of the bobbin 31 is formed with guide parts 31*b* and 31*d* for guiding a terminal lead wire that is a pulled wire portion of the coil winding in the vertical direction (direction along the central axis 1*a*). In the present embodiment, the guide parts 31*b* and 31*d* are formed in groove shapes. That is, the guide parts 31*b* and 31*d* are formed by guide grooves. In addition, the lower end part of the guide part 31*b* is formed with a guide part (guide groove) 31*c* for guiding the terminal lead wire to the outer circumferential surface of the coil winding part 31*a* in a circumferential direction.

Figure 3:
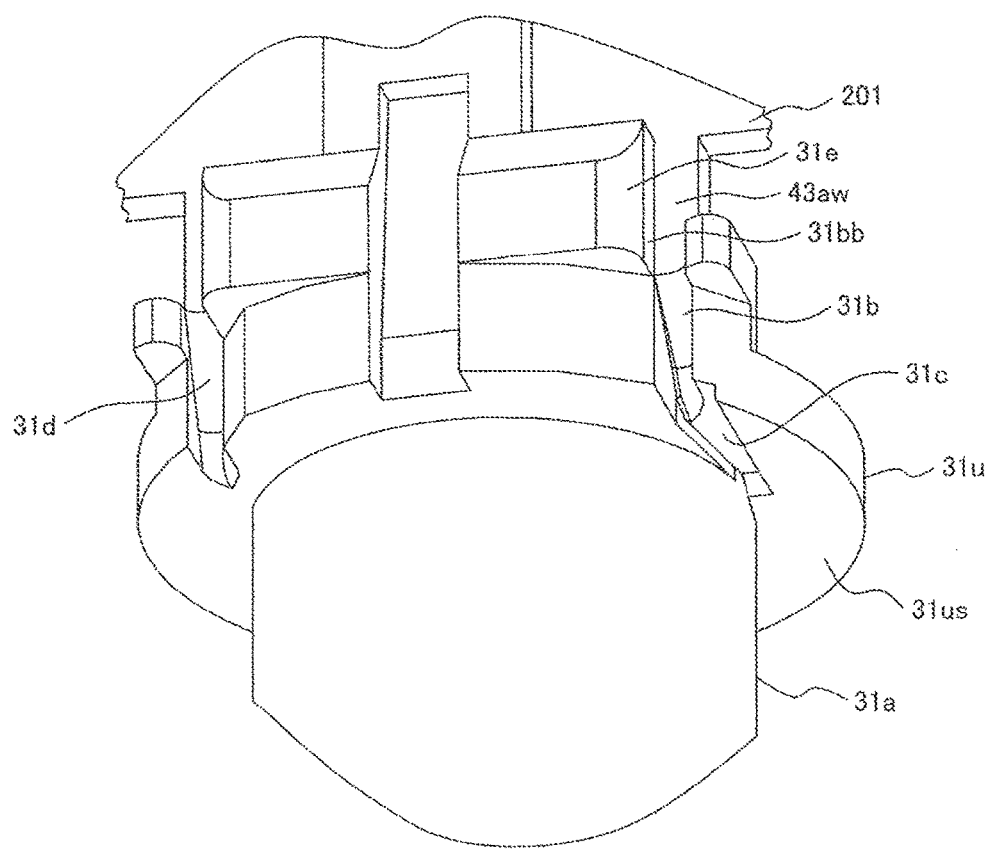
FIG. 3 shows a perspective view showing an enlarged part close to an upper flange part of a bobbin, in the coil device shown in FIG. 2.

Here, the guide parts 31*b* and 31*d* will be explained in detail using FIG. 3. FIG. 3 is a perspective view showing an enlarged part near the upper flange part of the bobbin, in the coil device shown in FIG. 2.

The guide part 31*b* is formed in a groove shape cut from the outer circumferential part of the upper flange part 31*u* toward the outer circumferential surface of the coil winding part 31*a* in a substantially tangential direction. The guide part 31*d* is also formed in a groove shape cut inward from the outer circumferential surface of the upper flange part 31*u*. The guide groove 31*b* and the guide groove 31*d* extend from the coil winding part 31*a* in a direction along the axis 31*j* of the bobbin 31 (vertical direction). The guide part 31*c* is formed in a groove shape on the lower end surface 31*us* of the upper flange part 31*u* so as to smoothly connect the lower end part of the guide part 31*b* with the outer circumferential surface of the coil winding part 31*a* while changing a direction.

The upper end part of the guide groove 31*b* is connected to the metal member forming the terminal 43*a*. In addition, the upper end part of the guide groove 31*d* is connected to the metal member forming the terminal 43*b*. A side edge part 43*aw* at the lower end part of the metal member forming the terminal 43*a* is therefore exposed from the embedded part (resin part) 31*e*. In addition, a side edge part 43*bw* at the lower end part of the metal member forming the terminal 43*b* is exposed from the embedded part (resin part) 31*e*. It is preferable that the bottom surfaces of the guide grooves 31*b* and 31*d* are smoothly connected to the surfaces of the metal members forming the terminals 34*a* and 43*b* respectively without steps.

The side edge part 43*aw* is the edge part in the width direction of the terminal 43*a* and the side edge part 43*bw* is the edge part in the width direction of the terminal 43*b*. In particular, the side edge part 43*aw* is the edge part on the opposite side to the edge part adjacent to the edge part on the opposite side to the side edge part 43*bw*.

Figure 4:
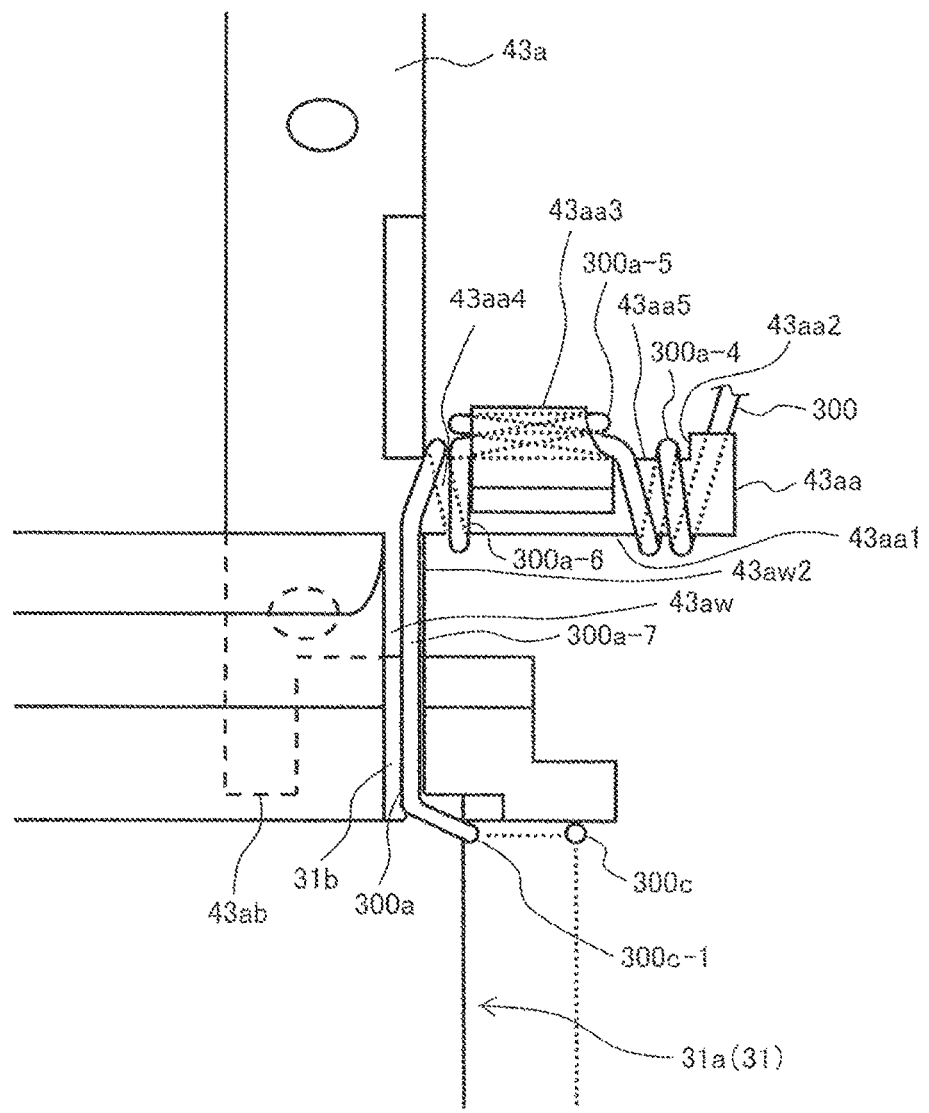
FIG. 4 shows an enlarged plan view showing an enlarged wrapping section 43aa of the coil device shown in FIG. 2.

FIG. 4 is an enlarged plan view showing the enlarged wrapping part 43*aa* of the coil device shown in FIG. 2. In FIG. 4, although the wrapping part 43*aa* on the winding start side of the coil winding 300 is shown, the wrapping part 43*ba* on the winding end side of the coil winding 300 is also configured similar to the wrapping part 43*aa*. The configuration on the wrapping part 43*ba* side corresponding to that of wrapping 43*aa* side is shown by reference signs with parenthesis.

in the wrapping part 43*aa* (43*ba*), a projecting portion 43*aa*2 (43*ba*2) is formed at the end part on the distal end side of a projecting part 43*aa*1 (43*ba*1), and a fusing part 43*aa*3 (43*ba*3) is provided on a distal end side (root side) with a clearance from the projecting portion 43*aa*2 (43*ba*2). An engaging part 43*aa*4 (43*ba*4) of a terminal lead wire 300*a* is provided on a distal end side (root side) further than the fusing part 43*aa*3 (43*ba*3).

As mentioned above, the wrapping part 43*aa* is formed integrally with the terminal 43 by press working of a metal plate, and the projecting part 43*aa*1, the projecting portion 43*aa*2, the fusing part 43*aa*3 and the engaging part 43*aa*4 are also formed integrally with the terminal 43*a* at the time of the above press working.

The projecting portion 43*aa*2 is formed at the distal end part of the projecting part 43*aa*1, and has a shape projecting upward.

A protruding part protruding upward is formed in the middle part of the projecting part 43*aa*1, and the upper end part of this protruding part is turned back downward, and the fusing part 43*aa*3 is formed. The sectional shape of the fusing part 43*aa*3 which is perpendicular to the projecting direction (longitudinal direction) of the projecting part 43*aa*1 therefore has a U-shape.

A concave part 43*aa*5 with the upper end (edge on the upper side) of the projecting part 43*aa*1 as a bottom is formed between the projecting portion 43*aa*2 and the fusing part 43*aa*3. In winding work of the coil winding 300, the concave part 43*aa*5 is a part around which the coil winding 300 is wound first.

The engaging part 43*aa*4 is disposed at the base end part of the projecting part 43*aa*1, and the terminal lead wire 300*a* is wound around and engaged with the engaging part 43*aa*4. The terminal lead wire 300*a* engaged with the engaging part 43*aa*4 is pulled out downward toward the coil winding part 31*a* of the bobbin 31.

As shown in FIG. 4, the coil winding 300 is wound around the wrapping part 43*aa*. In FIG. 4, the wrapping part 43*aa* on the winding start side of the coil winding 300 is shown. However, in the wrapping part 43*ba* on a winding end side, a terminal lead wire 300*b* is also wound similar to a wrapping part 43*aa* side (see FIG. 5).

The coil winding 300 is wound around the coil device 200 in order from (1) to (5) described below.
(1) The coil winding 300 is wound around a part at which the concave part 43*aa*5 of the projecting part 43*aa*1 is formed (300*a*-4).
(2) Next to (1), the coil winding 300 is wound around the fusing part 43*aa*3 (300*a*-5).
(3) Next to (2), the coil winding 300 is wound around the engaging part 43*aa*4 (300*a*-6).
(4) Next to (3), the coil winding 300 is inserted into the guide groove 31*b* formed on the upper flange part 31*u* of the bobbin 31 from the engaging part 43*aa*4, and wound to the lower end surface 31*us* of the upper flange part 31*u* (300*a*-7).
(5) Next to (4), the coil winding 300 is wound around the coil winding part 31*a* of the bobbin 31 (300*c*-1).

As mentioned above, the coil winding 300 is wound around the coil device 200, the terminal lead wire 300*a* (parts shown in the reference signs from 300*a*-1 to 300*a*-7) connecting a coil part 300*c* in which the coil winding 300 is wound around the bobbin 31 (the same as the electromagnetic coil 29 of FIG. 1) with the terminal 43*a* (wrapping part 43*aa*). The terminal lead wire 300*a* is the wiring part (lead part) between the coil part 300*c* and the terminal 43*a*. In addition, the terminal lead wire 300*a* is formed by one wire made of the same material as the coil winding 300 forming the coil part 300*c*.

When the winding of the coil winding 300 to the coil winding part 31*a* of the bobbin 31 is finished, the coil winding 300 is pulled out to a wrapping part 43*ba* side. In the following, the wrapping of the terminal lead wire 300*b* is carried out in order from (6) to (8).

(6) The coil winding 300 pulled out from the coil winding part 31*a* is inserted into the guide part 31*d* and wound around the engaging part 43*ba*4 of the wrapping part 43*ba* (corresponding to 300*a*-6 of FIG. 4).
(7) Next to (6), the coil winding 300 is wound around the fusing part 43*ba*3 (corresponding to 300*a*-5 of FIG. 4).
(8) Next to (7), the coil winding 300 is wound around a part at which a concave part 43*ba*5 of the projecting part 43*ba*1 is formed (corresponding to 300*a*-4 of FIG. 4).

By this wrapping, the terminal lead wire 300*b* (see FIG. 5) is formed which connects the coil part 300*c* in which the coil winding 300 is wound around the bobbin 31 with the terminal 43*b* (wrapping part 43*ba*). The terminal lead wire 300*b* is a wiring part (lead part) between the coil part 300*c* and the terminal 43*b*. In addition, the terminal lead wire 300*b* is formed by one wire made of the same material as the coil winding 300 forming the coil part 300*c*.

When the winding of the terminal lead wire 300*b* to the wrapping part 43*ba* is finished, fusing is performed to the fusing part 43*aa*3 of the wrapping part 43*aa* and the fusing part 43*ba*3 of the wrapping part 43*ba* (see FIG. 2), and the electrical connection of the terminal lead wire 300*a* with the wrapping part 43*aa* and the electrical connection of the terminal lead wire 300*b* with the wrapping part 43*ba* are performed. In this way, in the present embodiment, by wrapping the terminal lead wire 300*a* around the wrapping part 43*aa* and performing the fusing at the fusing part 43*aa*3, the electrical connection of the terminal lead wire 300*a* with the wrapping part 43*aa* is performed. In addition, by wrapping the terminal lead wire 300*b* around the wrapping part 43*ba* and performing the fusing at the fusing part 43*ba*3, the electrical connection of the terminal lead wire 300*b* with the wrapping part 43*ba* is performed. With this, the coil part 300*c* is electrically connected with the terminals 43*a* and 43*b*.

Figure 5:
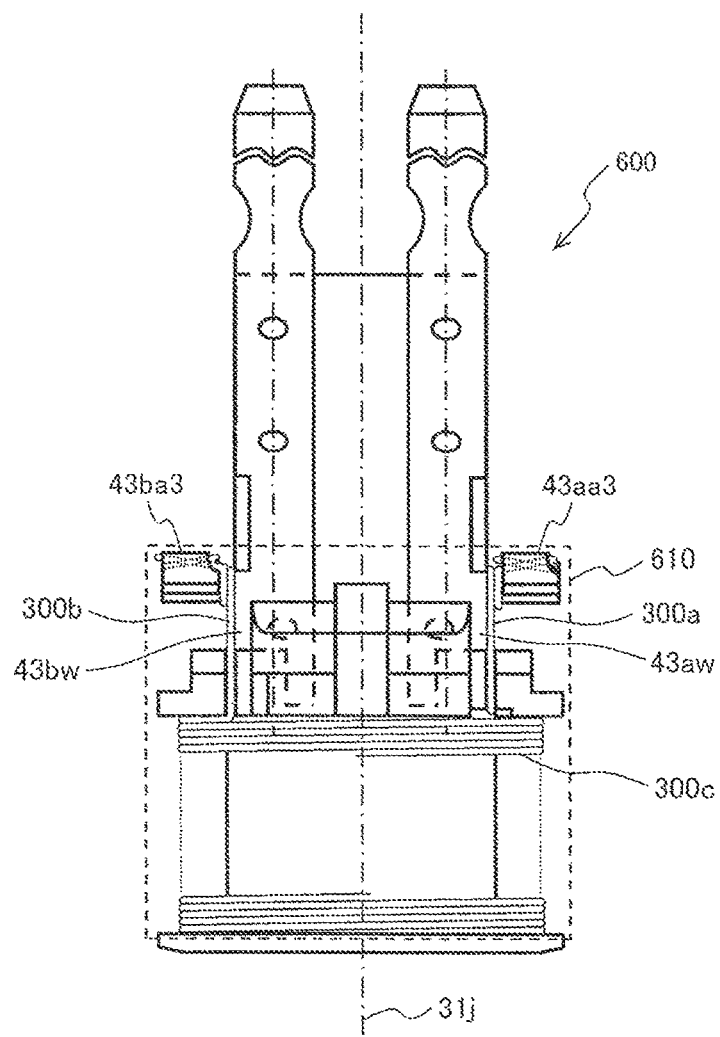
FIG. 5 is a plan vies showing a state in which the coil winding is wound around the coil device shown in FIG. 2 and its periphery is covered with resin.

FIG. 5 shows a plan view showing a state in which the coil winding is wound around the coil device shown in FIG. 2 and its periphery is covered with resin.

After the above fusing step, the projecting part 43*aa*1 on the distal end side more than the fusing part 43*aa*3 of the wrapping part 43*aa* is separated from the base end side (terminal 43*a*). In addition, the projecting part 43*ba*1 (see FIG. 2A) on the distal end side more than the fusing part 43*ba*3 of the wrapping part 43*ba* is separated from the base end side (terminal 43*b*).

As shown in FIG. 5, by covering the peripheries of the coil part 300*c* of the coil device 200, the terminal lead wires 300*a* and 300*b* and the wrapping parts 43*aa* and 43*ba* with a resin 610, electrical insulation is carried out, and the coil device 600 is completed.

At the time of this resin molding (second molding), there is a case where unexpected force is applied to the terminal lead wires 300*a* and 300*b* by the flow of the resin and contraction at the time of solidification of the resin. In addition, after the fuel injection valve is mounted on a vehicle, by the thermal expansion and the contraction of the resin of the peripheries of the terminal lead wires 300*a* and 300*b*, unexpected force may be applied to the terminal lead wires 300*a* and 300*b*. If the terminal lead wires 300*a* and 300*b* are not appropriately arranged (wired) on the coil device 600, by the application of these unexpected force, in the worst case, there is possibility that the terminal lead wires 300*a* and 300*b* are disconnected.

In the present embodiment, in a part on an upper side from the guide grooves 31*b* and 31*d*, the terminal lead wires 300*a* and 300*b* are arranged along the surface of the metal member forming the terminals 43*a* and 43*b*. At this time, it is preferable that the terminal lead wires 300a and 300b are wired so as to come into contact with the surface of the terminal 43a and the surface of the terminal 43b respectively. The side edge parts 43aw and 43bw at the lower end parts of the terminals 43a and 43b are therefore exposed from the embedded part (resin part) 31e.

That is, in the terminal 43a, the side edge part 43aw on the opposite side to the side edge part adjacent to the terminal 43b is exposed from the resin 31e forming the bobbin 31. In addition, in the terminal 43b, the side edge part 43bw on the opposite side to the side edge part adjacent to the terminal 43a is exposed from the resin 31e forming the bobbin 31. The terminal lead wire 300a is wired in a state of being in contact with the side edge part 43aw on the opposite side to the side edge part adjacent to the terminal 43b. In addition, the terminal lead wire 300b is wired in a state of being in contact with the side edge part 43bw on the opposite side to the side edge part adjacent to the terminal 43a.

At this time, the side edges 43aw2 and 43bw2 of the side edge parts 43aw and 43bw at the lower end parts of the terminals 43a and 43b are positioned at positions on fusing parts 43aa3 and 43ba3 sides from the positions at which the terminal lead wires 300a and 300b are pulled out (see FIG. 4 and FIG. 5). In addition, in the present embodiment, the side edges 43aw2 and 43bw2 of the side edge parts 43aw and 43bw of the terminals 43a and 43b are respectively aligned with the side edges 43aw1 and 43bw1 of the terminal 43a and 43b, side edges 43aw1 and 43bw1 which are positioned at positions upper than the concave parts 43ad and 43bd.

As compared with the difference between the thermal expansion coefficient of the terminal lead wires 300a and 300b and the thermal expansion coefficient of the resin, the difference between the thermal expansion coefficient of the terminal lead wires 300a and 300b and the thermal expansion coefficient of the terminals 43a and 43b is much smaller. The terminal lead wires 300a and 300b respectively come into contact with the terminal 43a and 43b having the small thermal expansion coefficient therebetween, and consequently, the terminal lead wires 300a and 300b are not affected by the deformation of the resin from the side on which the terminals 43a and 43b are disposed. Force applied to the terminal lead wires 300a and 300b by the deformation of the resin therefore becomes small. Accordingly, in the coil device 600 of the present invention, the possibility of the disconnection of the terminal lead wires 300a and 300b caused by the deformation of the resin can be small, and it is possible to realize a coil device having high reliability.

In addition, in the present embodiment, the terminals 43a and 43b are respectively disposed near the terminal lead wires 300a and 300b, and therefore the amount of the resin on the side on which the terminals 43a and 43b are disposed can be small. With this, the terminal lead wires 300a and 300b are hardly affected by the deformation of the resin. That is, even if a small amount of the resin enters between the terminal lead wires 300a and 300b and the terminals 43a and 43b, its influence is extremely small.

In the present embodiment, support parts for protecting the terminal lead wires 300a and 300b from the resin deformation are formed by the terminals 43a and 43b. It is therefore not necessary to add another member as a support part. Thus, cost and the number of manufacturing steps do not increase.

Figure 6:
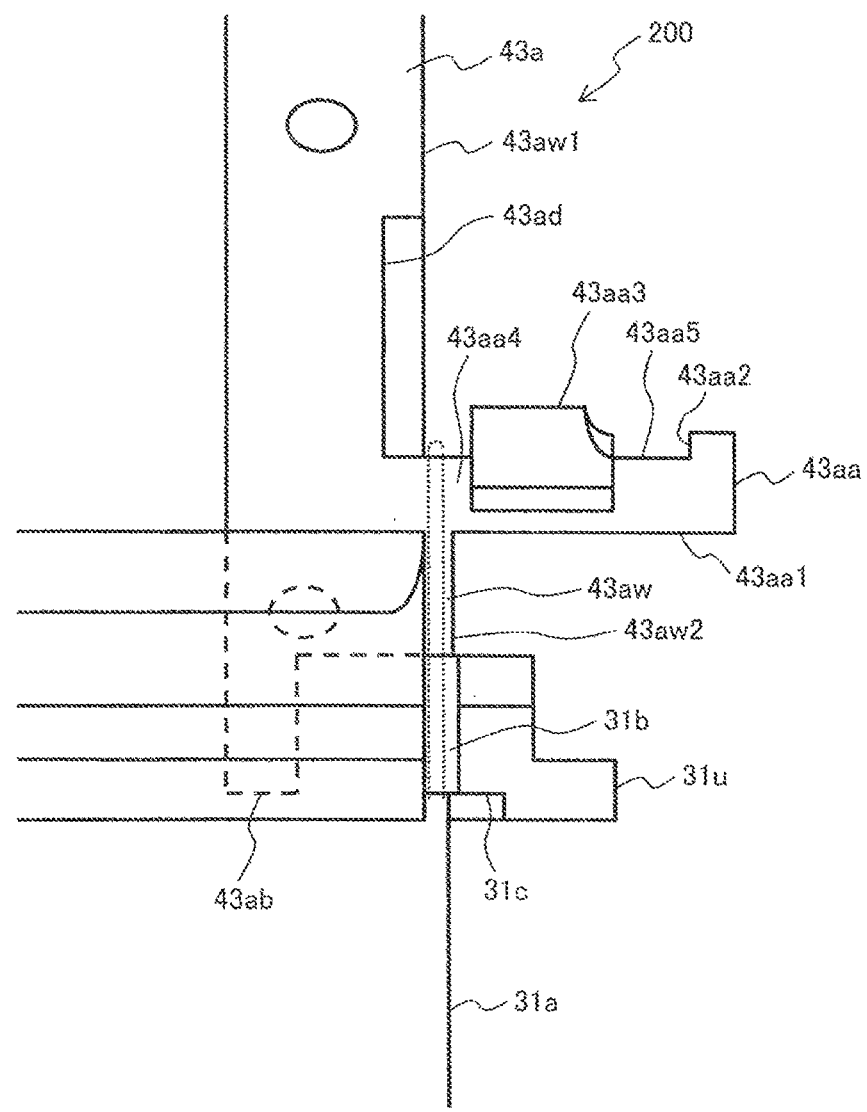
FIG. 6 is an enlarged plan view showing a variation (first variation) of a support part by a terminal member for a terminal lead wire.

Next, a variation (first variation) of the support part of each of the terminal lead wires 300a and 300b will be explained with reference to FIG. 6. FIG. 6 is an enlarged plan view showing the variation (first variation) of the support part by the terminal member for the terminal lead wire.

In the first variation, the side edge 43aw2 of the side edge part 43aw of the terminal 43a is formed so as to project on a fusing part 43aa3 side more than the side edge 43aw1 of the terminal 43a, side edge 43aw2 which is disposed at a position upper than the concave part 43ad. Although as not shown in FIG. 6, the side edge 43bw2 of the side edge part 43bw of the terminal 43b explained with FIG. 2 is formed so as to project on a fusing part 43ba3 side more than the side edge 43bw1 of the terminal 43b, side edge 43bw1 which is disposed at a position upper than the concave part 43bd.

That is, the side edge 43aw2 of the side edge part 43aw of the terminal 43a, with which the terminal lead wire 300a comes into contact, is formed to be the most projecting side edge of the side edges 43aw1 and 43aw2 on the same side of the terminal 43a, which projects on the side of the fusing part 43aa3 in which the terminal lead wire 300a is fused. In addition, the side edge 43bw2 of the side edge part 43bw of the terminal 43b, with which the terminal lead wire 300b comes into contact, is formed to be the most projecting side edge of the side edges 43bw1 and 43bw2 on the same side of the terminal 43b, which projects on the side of the fusing part 43ba3 in which the terminal lead wire 300b is fused.

With this, the terminal lead wires 300a and 300b pulled out from the guide grooves 31b and 31d can be surely supported with the side edge parts 43aw and 43bw of the terminals 43a and 43b respectively. In addition, the amount of the resin surrounding the peripheries of the terminal lead wires 300a and 300b can be small.

Figure 7:
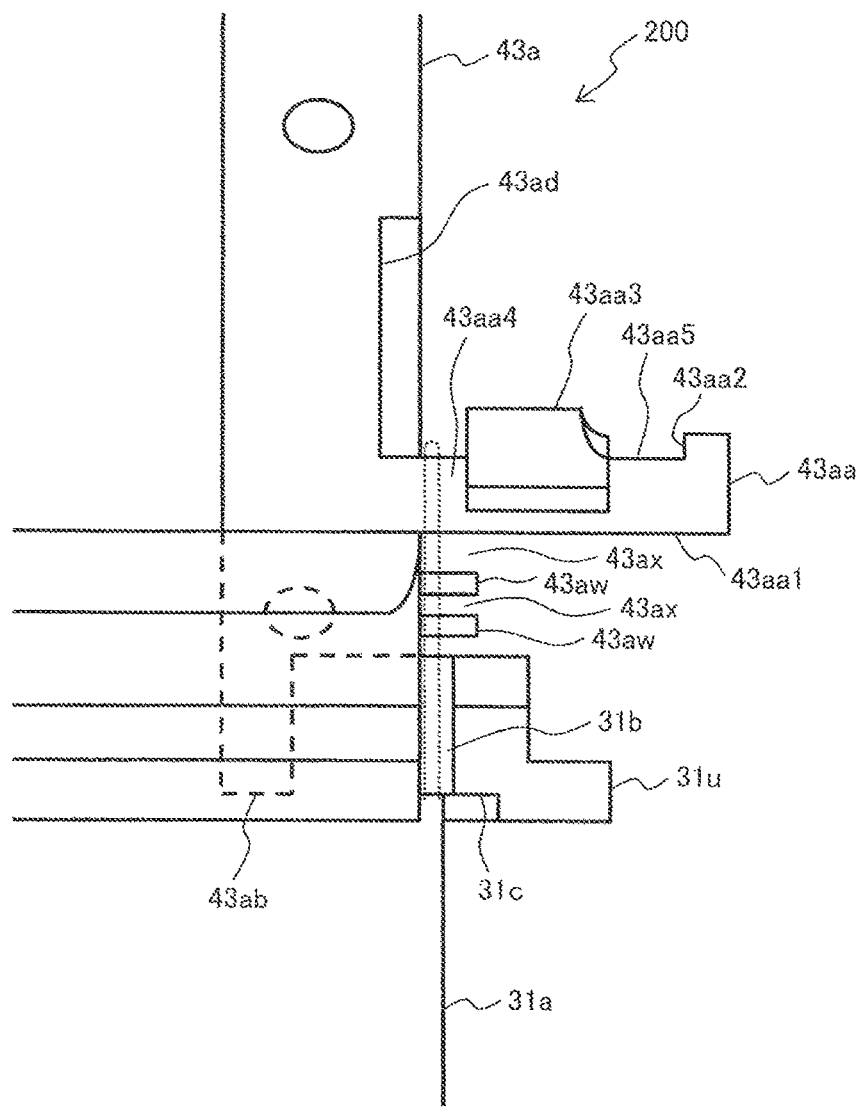
FIG. 7 is an enlarged plan view showing a variation (second variation) of the support part by the terminal member for the terminal lead wire.

Next, a variation of the support part of each of the terminal lead wires 300a and 300b will be explained with reference to FIG. 7. FIG. 7 is an enlarged plan view showing the variation (second variation) of the support part by the terminal material of the terminal lead wire.

In the second variation, the side edge part (support part) 43aw of the terminal 43a is divided into a plurality of parts in the direction along the axis 31j (vertical direction). That is, the side edge part (support part) of the terminal 43a is divided into a plurality of parts in the extending direction of the terminal 43a.

In this configuration, the terminal lead wire 300a can be wound around the engaging part 43aa4 using a gap 43ax between the side edge part 43aw and the lower edge part of the projecting part 43aa1. With this, winding workability to the coil device 200 can be improved.

Although it is not shown in FIG. 7, in the second variation, the side edge part 43bw of the terminal 43b explained in FIG. 2 is divided into a plurality of parts in the direction along the axis 31j (vertical direction), similar to a terminal 43a side. That is, the side edge part (support part) 43bw of the terminal 43b is divided into a plurality of parts in the extending direction of the terminal 43b.

In the gap 43ax between the side edge part 43aw and the lower edge part of the projecting part 43aa1 and a gap 43ax between a plurality of the side edge parts 43aw, the entire periphery of the terminal lead wire 300a is surrounded by the resin of the second molding, and the terminal lead wire 300a is easily affected by the resin deformation. It is therefore necessary that the interval between the plurality of the side edge parts 43aw and the length of each of the side edge parts 43aw in the direction along the axis 31j are each set to a dimension in which the influence of the resin deformation does not become a problem.

In the embodiment of the present invention and its variations mentioned above, the side edge part 43aw at the lower end part (embedded end part) of the metal member forming the terminal 43a extends outside (outer circumferential side) more than the terminal lead wires 300a and 300b in the radial direction of the bobbin 31. The side edge 43aw2 of the side edge part 43aw is positioned outside (outer circumferential side) more than the terminal lead wires 300a and 300b.

That is, the terminal 43a includes an extending part between the wrapping part 43aa and the bobbing 31, which extends outside more than the terminal lead wire 300a in the radial direction of the bobbin 31. This extending part is provided to extend such that the side edge 43aw2 of the terminal 43a along the terminal lead wire 300a is positioned on the outer circumferential side from the terminal lead wire 300a in the radial direction of the bobbin 31.

With this, the force generated by the thermal expansion coefficient difference which is applied to the terminal lead wire 300a from the surrounding resin can be small.

However, even if it is configured as the following variations (a third variation and a fourth variation), the force generated by the thermal expansion coefficient difference which is applied to the terminal lead wire 300a from the surrounding resin can be also small. However, it can be expected that the above embodiment, the first variation and the second variation exhibit a larger effect than the following third variation and fourth variation.

Figure 8:
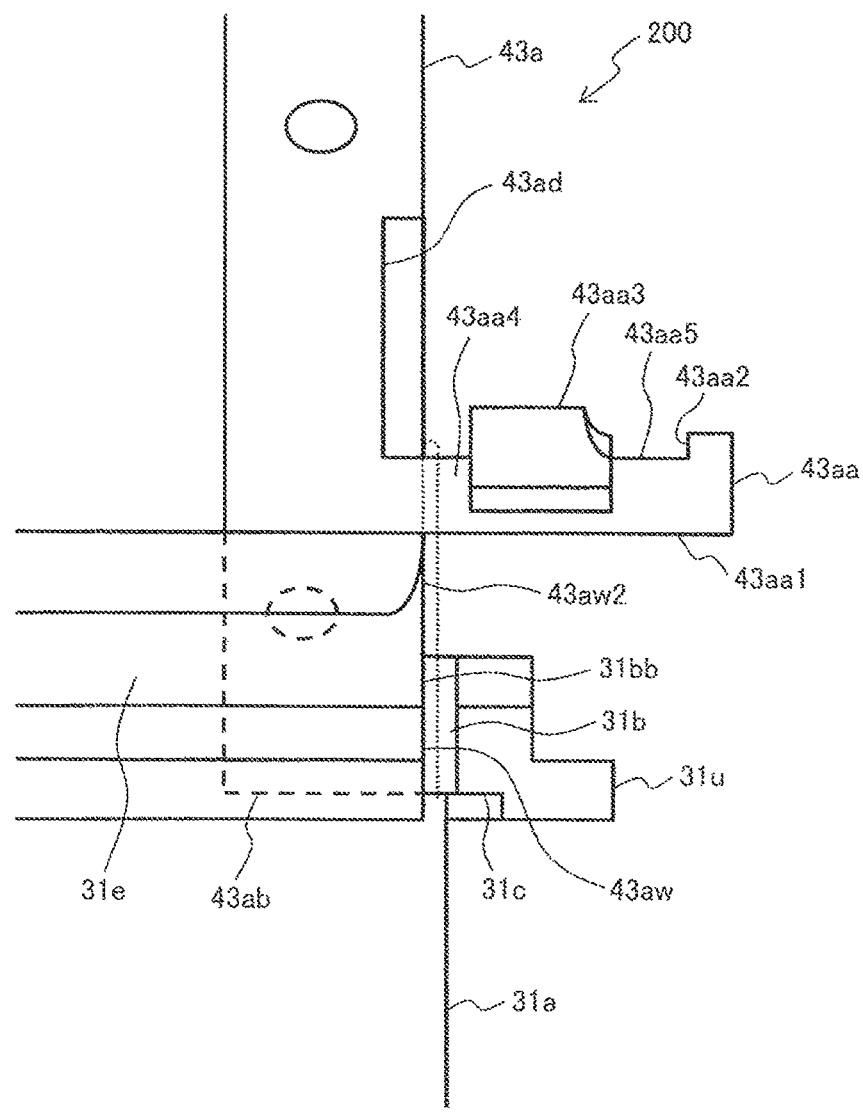
FIG. 8 is an enlarged plan view showing a variation (third variation) of the support part by the terminal member for the terminal lead wire.

Next, a variation (third variation) of the support part of each of the terminal lead wires 300a and 300b will be explained with reference to FIG. 8. FIG. 8 is an enlarged plan view showing the variation (third variation) of the support part by the terminal member for the terminal lead wire.

In the third variation, although the side edge part 43aw exposed from the embedded part (resin part) 31e is not provided at the lower end part (embedded end part) of the metal member forming the terminal 43a, the side edge 43aw2 at the lower end part of the metal member extends in the width direction (direction orthogonal to the longitudinal direction) of the terminal 43a, to a side wall surface 31bb of the embedded part 31e. With this, the side edge 43aw2 at the lower end part of the terminal 43a extends to the terminal lead wire 300a in the width direction of the terminal 43a. In addition, the side wall surface 31bb of the embedded part 31e forms a side wall of the guide groove 31b. Accordingly, the side edge 43aw2 at the lower end part of the terminal 43a extends in the width direction of the terminal 43a to the side wall of the guide groove 31b.

In this case, the side edge 43aw2 at the lower end part of the terminal 43a is exposed to the guide groove 31b. The side edge 43aw2 may be covered with the resin of the embedded part 31e. However, in this case, it is covered with a thin resin film.

With this, the terminal 43a includes an extending part at the embedded end part embedded in the bobbin 31, extending part which extends in the radial direction of the bobbin 31 to the position of the terminal lead wire 300a. This extending part extends such that the side edge 43aw2 of the terminal 43a provided along the terminal lead wire 300a is positioned at a position close to the terminal lead wire 300a. The side edge 43aw2 of the terminal 43a is linearly formed in the longitudinal direction (the axial direction of the bobbin 31) from the wrapping part 43aa to the lower end of the terminal 43a.

With this, the metal member at the lower end part of the terminal 43a is positioned at a position close to the terminal lead wire 300a, and the force generated by the thermal expansion coefficient difference which is applied to the terminal lead wire 300a from the surrounding resin can be small. In addition, in this case, the terminal lead wire 300a may come into contact with the side edge 43aw2 at the lower end part of the terminal which is exposed to the guide groove 31b.

The terminal 43b on a terminal lead wire 300b side is also configured similar to the terminal 43a in the third variation.

Figure 9:
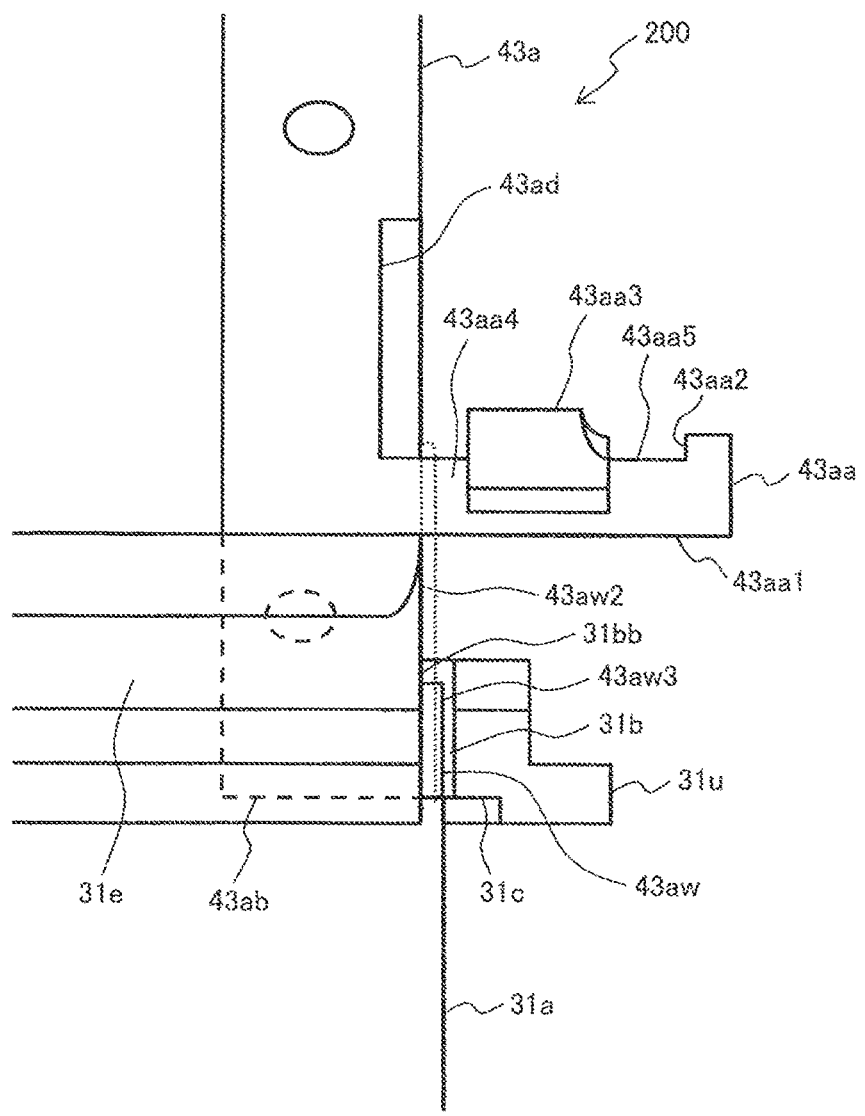
FIG. 9 is an enlarged plan view showing a variation (fourth variation) of the support part by the terminal member for the terminal lead wire.

The variation (fourth variation) of the support part of each of the terminal lead wires 300a and 300b will be explained with reference to FIG. 9. FIG. 9 is an enlarged plan view showing the variation (fourth variation) of the support part by the terminal member for the terminal lead wire.

In the fourth variation, with respect to the third variation, a side edge 43aw3 at the lower end part (embedded end part) of the terminal 43a is completely exposed from the side wall surface 31bb of the embedded part 31e, and extends in the width direction of the terminal 43a to the inside of the guide groove 31b. In this case, the side edge 43aw3 at the lower end part of the terminal extends to the middle in the width direction of the guide groove 31b such that the metal member of the terminal 43a extending to the inside of the guide groove 31b does not completely close the guide groove 31b. In the present variation, the side edge 43aw3 at the lower end part of the terminal extends outside (outer circumferential side) more than the terminal lead wire 300a in the radial direction of the bobbin 31. In addition, the configuration of the part of the side edge 43aw2 is similar to the third variation.

In the fourth variation, the side edge 43aw3 of the terminal 43a is connected to the lower end of the side edge 43aw2, and linearly formed to the lower end of the terminal 43a in the longitudinal direction of the terminal 43a.

With this, the metal material of the terminal 4 existing at a position close to the terminal lead wire 300a increases, and the force generated by the thermal expansion coefficient difference which is applied to the terminal lead wire 300a from the surrounding resin of the fourth variation can be smaller than that of the third variation. In this case, the terminal lead wire 300a may come into contact with the side edge 43aw3 provided at the lower end part of the terminal which is exposed to the guide groove 31b.

In addition, the terminal 43b on a terminal lead wire 300b side is also configured similar to the terminal 43a of the fourth variation.

Figure 10:
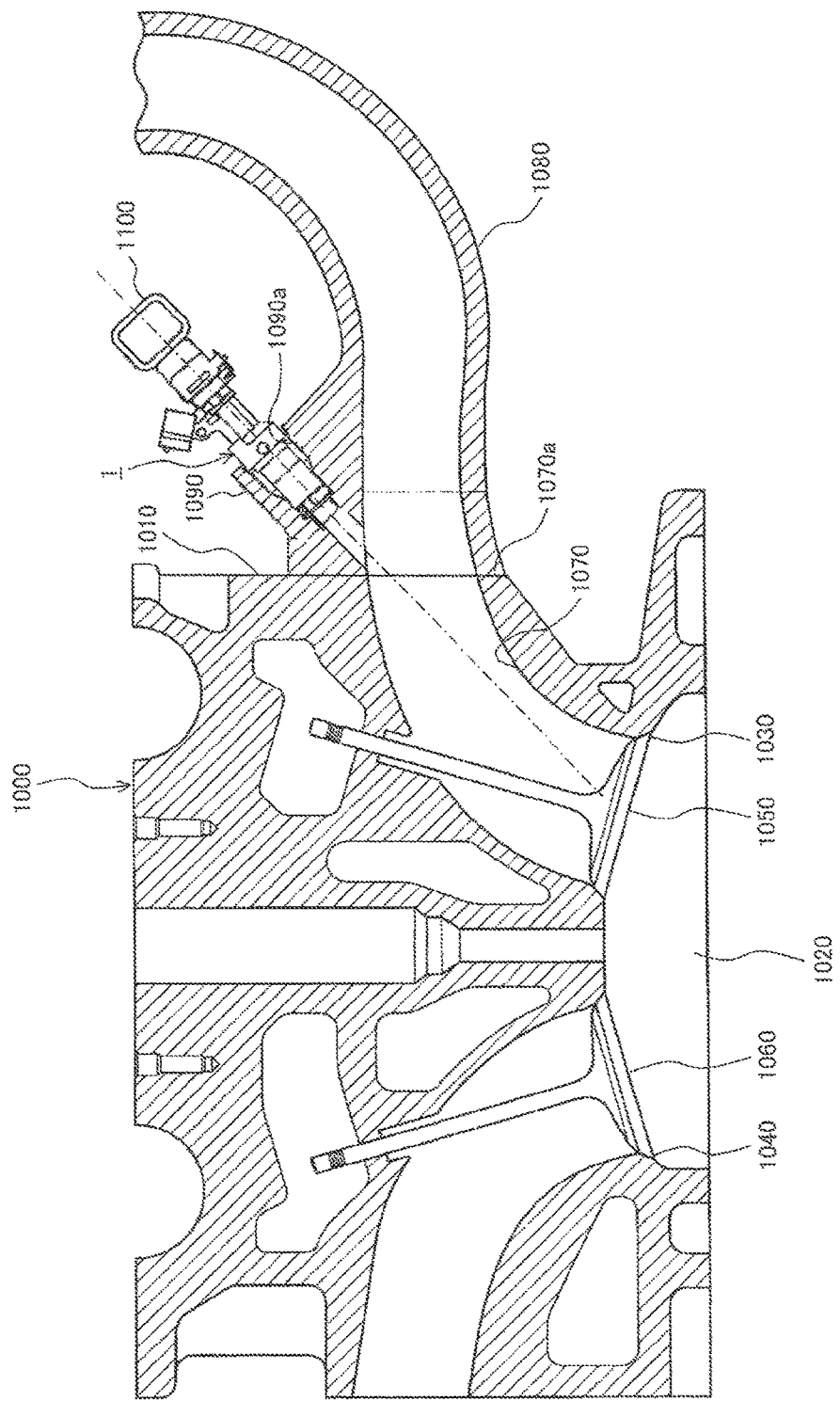
FIG. 10 is a sectional view of an internal combustion engine on which the fuel injection valve according to the present invention is mounted.

Next, the internal combustion engine on which the fuel injection valve according to the present invention is mounted will be explained with reference to FIG. 10. FIG. 10 is a sectional view of the internal combustion engine on which the fuel injection valve 1 is mounted. In the present invention, the fuel injection valve 1 will be explained in which a plurality of fuel injection holes 110 are divided into two groups, and the fuel is injected through the fuel injection valve holes 110 of each of the groups in two different directions.

An engine block 1010 of an internal combustion engine 1000 is formed with a cylinder 1020, and an intake port 1030 and an exhaust port 1040 are provided at the top part of the cylinder 1020. The intake port 1030 is provided with an intake valve 1050 opening and closing the intake port 1030, and the exhaust port 1040 is provided with an exhaust valve 1060 opening and closing the exhaust port 1040. An intake pipe 1080 is connected to an inlet side end part 1070a of an intake flow passage 1070 formed in the engine block 1010 and communicated to the intake port 1030.

A fuel pipe 1100 is connected to the fuel supply port 2 of the fuel injection valve 1 (see FIG. 1A).

The intake pipe 1080 is formed with an attaching part 1090 for the fuel injection valve 1, and the attaching part 1090 is formed with an insertion port 1090a into which the fuel injection valve 1 is inserted. The insertion port 1090a penetrates to the inner wall surface of the intake pipe 1080 (intake flow passage), and the fuel injected from the fuel injection valve 1 inserted into the insertion port 1090a is injected into the intake flow passage. In a case of two-directional spray, in an internal combustion engine in which two intake ports 1030 are provided in the engine block 1010, fuel injection sprays are injected toward the respective intake ports 1030 (intake valve 1050).

In addition, the arrangement, the number and the angle of the fuel injection holes 110 and the injection direction and the number of the fuel sprays can be appropriately changed according to the mode of the internal combustion engine.

In addition, the present invention is not limited to the above embodiment, and a part of the configuration can be deleted and another configuration which is not described can be added. Moreover, it may be configured by appropriately combining the embodiment and the variations.

As a fuel injection valve based on the embodiment explained above, the following aspects can be considered.

That is, in one aspect of the fuel injection valve, the fuel injection valve includes: a valve seat and a valve body cooperatively opening and closing a fuel passage; and an electromagnetic drive part including a fixed iron core, a movable iron core and a coil device, which is configured to drive the valve body, wherein the coil device includes: a bobbin having a winding part around which a coil winding is wound; a terminal, one end part thereof embedded in the bobbin and the other end part thereof extending from the bobbin in an axial direction of the bobbin; and a wrapping part which is provided to the terminal and in which a terminal lead wire pulled out from a coil part that is wound around the winding part is wrapped and fused, wherein the terminal lead wire is wired between the bobbin and the wrapping part in a state of being in contact with a surface of the terminal, and wherein peripheries of the bobbin, a wiring part of the terminal lead wire and the wrapping part are covered with a resin.

In a preferable aspect of the fuel injection valve, the end part of the terminal which is located on a lower side of the wrapping part is embedded in a resin forming the bobbin, a side edge part at the end part of the terminal which is embedded in the resin is exposed from the resin forming the bobbin, and the terminal lead wire is wired in a state of being in contact with the side edge part exposed from the resin.

In another preferable aspect, in any of aspects of the fuel injection valve, the terminal includes a first terminal to which a first terminal lead wire pulled out from one end part of the coil part is connected, and a second terminal to which a second terminal lead wire pulled out from the other end part of the coil part is connected, the first terminal and the second terminal extend parallel to each other in the axial direction from the bobbin, the first terminal includes a wrapping part which is formed so as to project from side edges positioned on an opposite side to a side edge adjacent to the second terminal toward an opposite side to the second terminal, the second terminal includes a wrapping part which is formed so as to project from side edges positioned on an opposite side to a side edge adjacent to the first terminal toward an opposite side to the first terminal, a side edge part of the first terminal which is positioned on an opposite side to a side edge part adjacent to the second terminal is exposed from the resin forming the bobbin, a side edge part of the second terminal which is positioned on an opposite side to a side edge part adjacent to the first terminal is exposed from the resin forming the bobbin, the first terminal lead wire is wired in a state of being in contact with the side edge part of the first terminal which is positioned on the opposite side to the side edge part adjacent to the second terminal, and the second terminal lead wire is wired in a state of being in contact with the side edge part of the second terminal which is positioned on the opposite side to the side edge part adjacent to the first terminal.

In yet another preferable aspect, in any of aspects of the fuel injection valve, the bobbin includes flange parts at respective both end parts of the winding part in the axial direction, the flange part of both of the end parts in the axial direction of the bobbin, the flange part which is provided at the end part on a side on which the terminal is embedded, includes a first guide groove to pull out the first terminal lead wire from one end part of the coil part and a second guide groove to pull out the second terminal lead wire from the other end part of the coil part, the first guide groove is connected to the side edge part of the first terminal, the side edge part with which the first terminal lead wire comes into contact, and the second guide groove is connected to the side edge part of the second terminal, the side edge part with which the second terminal lead wire comes into contact.

In yet another preferable aspect, in any of aspects of the fuel injection valve, the side edge of the side edge part of the first terminal, the side edge part with which the first terminal lead wire comes into contact, is formed to be a most projecting side edge of the side edges on the same side of the first terminal, which projects on a side of a fusing part in which the first terminal lead wire is fused, and the side edge of the side edge part of the second terminal, the side edge part with which the second terminal lead wire comes into contact, is formed to be a most projecting side edge of the side edges on the same side of the second terminal, which projects to a side of a fusing part in which the second terminal lead wire is fused.

In yet another preferable aspect, in any of aspects of the fuel injection valve, the side edge part of the first terminal, with which the first terminal lead wire comes into contact, is divided into a plurality of parts in an extending direction of the first terminal, and the side edge part of the second terminal, with which the second terminal lead wire comes into contact, is divided into a plurality of parts in an extending direction of the second terminal.

In addition, from another viewpoint, in one aspect of a fuel injection valve, the fuel injection valve includes: a valve seat and a valve body cooperatively opening and closing a fuel passage; and an electromagnetic drive part including a fixed iron core, a movable iron core and a coil device, which is configured to drive the valve body, wherein the coil device includes: a bobbin having a winding part around which a coil winding is wound; a terminal, one end part thereof embedded in the bobbin and the other end part thereof extending from the bobbin in an axial direction of the bobbin; a wrapping part which is provided to the terminal and in which a terminal lead wire pulled out from a coil part that is wound around the winding part is wrapped and fused; and a resin part covering peripheries of a wiring part of the terminal lead wire and the wrapping part, and wherein the terminal includes an extending part at an embedded end part embedded in the bobbin, the extending part which extends in a radial direction of the bobbin to a position of the terminal lead wire.

In a preferable aspect of the fuel injection valve, the bobbin includes a guide groove on which the terminal lead wire is disposed, and the side edge at the embedded end part embedded in the bobbin extends to at least a side wall of the guide groove.

In addition, from another viewpoint, a fuel injection valve includes: a valve seat and a valve body cooperatively opening and closing a fuel passage; and an electromagnetic drive part including a fixed iron core, a movable iron core and a coil device, which is configured to drive the valve body, wherein the coil device includes: a bobbin having a winding part around which a coil winding is wound; a terminal, one end part thereof embedded in the bobbin and the other end part thereof extending from the bobbin in an axial direction of the bobbin; a wrapping part which is provided to the terminal and in which a terminal lead wire pulled out from a coil part that is wound around the winding part is wrapped and fused; and a resin part covering peripheries of a wiring part of the terminal lead wire and the wrapping part, and wherein the terminal includes an extending part provided between the wrapping part and the bobbin, the extending part which extends outside more than the terminal lead wire in a radial direction of the bobbin.

EXPLANATION OF SIGNS

31: bobbin, 31*a*: coil winding part, 31*e*: embedded part of terminal 43, 31*b*, 31*c* and 31*d*: guide part, 31*l*: lower flange part (lower-part flange part), 31*u*: upper flange part (upper-part flange part), 43, 43*a* and 43*b*: terminal, 43*aa* and 43*ba*: wrapping part, 43*ab*: one end part (lower end part) of terminal 43*a*, 43*ac*: the other end part (upper end part) of terminal 43*a*, 43*aw*: side edge part (support part) of terminal 43*a*, 43*bb*: one end part (lower end part) of terminal 43*b*, 43*bc*: the other end part (upper end part) of terminal 43*b*, 43*aa*1 and 43*ba*1: projecting part, 43*aa*2 and 43*ba*2: projecting portion, 43*aa*3 and 43*ba*3: fusing part, 43*aa*4 and 43*ba*4: engaging part, 43*aa*5 and 43*ba*5: concave part, 200: coil device, 300: coil winding, 300*a* and 300*b*: terminal lead wire, 300*c*: coil part, 600: coil device, 610: resin

The invention claimed is:

1. A fuel injection valve comprising:
   a valve seat and a valve body cooperatively opening and closing a fuel passage; and
   an electromagnetic drive part including a fixed iron core, a movable iron core and a coil device, which is configured to drive the valve body,
   wherein the coil device includes:
   a bobbin having a winding part around which a coil winding is wound;
   a terminal, one end part thereof embedded in the bobbin and the other end part thereof extending from the bobbin in an axial direction of the bobbin; and
   a wrapping part which is provided to the terminal and in which a terminal lead wire pulled out from a coil part that is wound around the winding part is wrapped and fused,
   wherein the terminal lead wire is wired between the bobbin and the wrapping part in a state of being in contact with a surface of the terminal,
   wherein peripheries of the bobbin, a wiring part of the terminal lead wire and the wrapping part are covered with a resin,
   wherein the end part of the terminal which is located on a lower side of the wrapping part is embedded in a resin forming the bobbin,
   wherein a side edge part at the end part of the terminal which is embedded in the resin is exposed from the resin forming the bobbin, and
   wherein the terminal lead wire is wired in a state of being in contact with the side edge part exposed from the resin.

2. The fuel injection valve according to claim 1, wherein the terminal includes a first terminal to which a first terminal lead wire pulled out from one end part of the coil part is connected, and a second terminal to which a second terminal lead wire pulled out from the other end part of the coil part is connected,
   wherein the first terminal and the second terminal extend parallel to each other in the axial direction from the bobbin,
   wherein the first terminal includes a wrapping part which is formed so as to project from side edges positioned on an opposite side to a side edge adjacent to the second terminal toward an opposite side to the second terminal,
   wherein the second terminal includes a wrapping part which is formed so as to project from side edges positioned on an opposite side to a side edge adjacent to the first terminal toward an opposite side to the first terminal,
   wherein a side edge part of the first terminal which is positioned on an opposite side to a side edge part adjacent to the second terminal is exposed from the resin forming the bobbin,
   wherein a side edge part of the second terminal which is positioned on an opposite side to a side edge part adjacent to the first terminal is exposed from the resin forming the bobbin,
   wherein the first terminal lead wire is wired in a state of being in contact with the side edge part of the first terminal which is positioned on the opposite side to the side edge part adjacent to the second terminal, and
   wherein the second terminal lead wire is wired in a state of being in contact with the side edge part of the second terminal which is positioned on the opposite side to the side edge part adjacent to the first terminal.

3. The fuel injection valve according to claim 2, wherein the bobbin includes flange parts at respective both end parts of the winding part in the axial direction,
   wherein the flange part of both of the end parts in the axial direction of the bobbin, the flange part which is provided at the end part on a side on which the terminal is embedded, includes a first guide groove to pull out the first terminal lead wire from one end part of the coil part and a second guide groove to pull out the second terminal lead wire from the other end part of the coil part,
   wherein the first guide groove is connected to the side edge part of the first terminal, the side edge part with which the first terminal lead wire comes into contact, and
   wherein the second guide groove is connected to the side edge part of the second terminal, the side edge part with which the second terminal lead wire comes into contact.

4. The fuel injection valve according to claim 3, wherein the side edge of the side edge part of the first terminal, the side edge part with which the first terminal lead wire comes into contact, is formed to be a most projecting side edge of the side edges on the same side of the first terminal, which projects on a side of a fusing part in which the first terminal lead wire is fused, and
   wherein the side edge of the side edge part of the second terminal, the side edge part with which the second terminal lead wire comes into contact, is formed to be a most projecting side edge of the side edges on the same side of the second terminal, which projects to a side of a fusing part in which the second terminal lead wire is fused.

5. The fuel injection valve according to claim 3, wherein the side edge part of the first terminal, with which the first terminal lead wire comes into contact, is divided into a plurality of parts in an extending direction of the first terminal, and wherein the side edge part of the second terminal, with which the second terminal lead wire comes into contact, is divided into a plurality of parts in an extending direction of the second terminal.

6. A fuel injection valve comprising:

a valve seat and a valve body cooperatively opening and closing a fuel passage; and an electromagnetic drive part including a fixed iron core, a movable iron core and a coil device, which is configured to drive the valve body, wherein the coil device includes:

a bobbin having a winding part around which a coil winding is wound;

a terminal, one end part thereof embedded in the bobbin and the other end part thereof extending from the bobbin in an axial direction of the bobbin;

a wrapping part which is provided to the terminal and in which a terminal lead wire pulled out from a coil part that is wound around the winding part is wrapped and fused; and a resin part covering peripheries of a wiring part of the terminal lead wire and the wrapping part, and wherein the terminal includes an extending part at an embedded end part embedded in the bobbin, the extending part which extends in a radial direction of the bobbin to a position of the terminal lead wire.

7. The fuel injection valve according to claim 6, wherein the bobbin includes a guide groove on which the terminal lead wire is disposed, and wherein the side edge at the embedded end part embedded in the bobbin extends to at least a side wall of the guide groove.

8. A fuel injection valve comprising:

a valve seat and a valve body cooperatively opening and closing a fuel passage; and an electromagnetic drive part including a fixed iron core, a movable iron core and a coil device, which is configured to drive the valve body, wherein the coil device includes:

a bobbin having a winding part around which a coil winding is wound;

a terminal, one end part thereof embedded in the bobbin and the other end part thereof extending from the bobbin in an axial direction of the bobbin;

a wrapping part which is provided to the terminal and in which a terminal lead wire pulled out from a coil part that is wound around the winding part is wrapped and fused; and a resin part covering peripheries of a wiring part of the terminal lead wire and the wrapping part, and wherein the terminal includes an extending part provided between the wrapping part and the bobbin, the extending part which extends outside more than the terminal lead wire in a radial direction of the bobbin, wherein the end part of the terminal which is located on a lower side of the wrapping part is embedded in a resin forming the bobbin, wherein a side edge part at the end part of the terminal which is embedded in the resin is exposed from the resin forming the bobbin, and wherein the terminal lead wire is wired in a state of being in contact with the side edge part exposed from the resin.

* * * * *